United States Patent
Chauhan et al.

(10) Patent No.: US 11,864,033 B2
(45) Date of Patent: *Jan. 2, 2024

(54) SYSTEM AND METHOD FOR IMS PDN RECOVERY

(71) Applicant: Jio Platforms Limited, Ahmedabad (IN)

(72) Inventors: Devesh Chauhan, Maharashtra (IN); Mukesh Singh, Maharashtra (IN); Veera Sai Satyanarayana Rasad Marni, Maharashtra (IN); Abhilash Shrivastava, Maharashtra (IN)

(73) Assignee: JIO PLATFORMS LIMITED, Ahmedabad (IN)

(*) Notice: Subject to any disclaimer, the term of this patent is extended or adjusted under 35 U.S.C. 154(b) by 0 days.

This patent is subject to a terminal disclaimer.

(21) Appl. No.: 18/045,882

(22) Filed: Oct. 12, 2022

(65) Prior Publication Data

US 2023/0062500 A1 Mar. 2, 2023

Related U.S. Application Data

(63) Continuation of application No. 16/662,470, filed on Oct. 24, 2019, now Pat. No. 11,503,511.

(30) Foreign Application Priority Data

Oct. 24, 2018 (IN) .............................. 201821040140

(51) Int. Cl.
*H04W 72/04* (2023.01)
*H04W 8/02* (2009.01)
(Continued)

(52) U.S. Cl.
CPC ..... *H04W 36/0022* (2013.01); *H04L 65/1016* (2013.01); *H04W 36/14* (2013.01);
(Continued)

(58) Field of Classification Search
CPC ..... H04W 60/06; H04W 48/17; H04W 48/18; H04W 84/12; H04W 84/042;
(Continued)

(56) References Cited

U.S. PATENT DOCUMENTS

2013/0094371 A1 4/2013 Vallath
2013/0329638 A1* 12/2013 Ren ..................... H04W 60/005
370/328
(Continued)

*Primary Examiner* — Wutchung Chu
*Assistant Examiner* — Jason A Harley
(74) *Attorney, Agent, or Firm* — Finnegan, Henderson, Farabow, Garrett & Dunner, LLP (57) ABSTRACT

A system and method, for identification of the user equipment [102] with IMS PDN connectivity issues, and proactively recovering the PDN connectivity for said user equipment is disclosed. The disclosure provides triggering the System [104] initiated detach with re-attach required request, to user equipment [102] by checking the current IMS PDN state of said VoLTE user equipment [102] to recover the IMS PDN connectivity. The present disclosure provides a novel automatic method for maintaining IMS PDN connection providing continuous voice call connectivity and improving the overall connectivity and user experience of the wireless network.

17 Claims, 7 Drawing Sheets

(51) Int. Cl.
*H04L 65/1016* (2022.01)
*H04W 36/12* (2009.01)
*H04W 76/10* (2018.01)
*H04L 5/00* (2006.01)
*H04W 36/00* (2009.01)
*H04W 76/18* (2018.01)
*H04W 36/14* (2009.01)
*H04W 76/12* (2018.01)
*H04W 48/18* (2009.01)

(52) U.S. Cl.
CPC ........... *H04W 48/18* (2013.01); *H04W 76/12* (2018.02); *H04W 76/18* (2018.02)

(58) Field of Classification Search
CPC ............. H04W 88/02; H04L 2101/375; H04L 65/1073; H04L 65/1046; H04L 65/1016
USPC .............. 455/435.1, 41.2, 436; 370/329, 331
See application file for complete search history.

(56) References Cited

U.S. PATENT DOCUMENTS

| | | | |
|---|---|---|---|
| 2016/0088545 A1* | 3/2016 | Rönneke | H04W 8/18 455/418 |
| 2016/0165518 A1* | 6/2016 | Keller | H04L 67/143 455/450 |
| 2017/0171256 A1* | 6/2017 | Liang | H04L 65/40 |
| 2019/0104425 A1* | 4/2019 | Kim | H04W 76/19 |
| 2019/0394245 A1 | 12/2019 | Neimi | |
| 2020/0059856 A1* | 2/2020 | Cui | H04W 24/02 |

\* cited by examiner

SYSTEM AND METHOD FOR IMS PDN RECOVERY

FIELD OF INVENTION

The present disclosure relates generally to wireless network and more particularly to, a detach solution for IP Multimedia Core Network Subsystem (IMS) Packet Data Network (PDN) recovery in Voice over LTE (VoLTE) UE/devices for providing seamless connectivity and voice call in IP network.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

A typical contemporary wireless network is deployed to provide various communication services including, but not limiting to, video, data, advertisement, content, messaging and broadcast. The network has usually multiple access networks to support communications for multiple users by sharing the available network resources. The earlier UTRAN (Universal Mobile Telecommunications System-Terrestrial Radio Access Network) is radio access network (RAN), which was defined as a part of the Universal Mobile Telecommunications System (UMTS), a third-generation (3G) mobile phone technology supported by the 3rd Generation Partnership Project (3GPP). The UMTS technology, which is the successor to Global System for Mobile Communications (GSM) technologies, currently supports various air interface standards, such as Wideband Code Division Multiple Access (W-CDMA), Time Division-Code Division Multiple Access (TD-SCDMA), and Time Division-Synchronous Code Division Multiple Access (TD-SCDMA). Also, the UMTS supports enhanced 3G data communications protocols such as the High-Speed Packet Access (HSPA) that provides higher data transfer speeds and capacity to associated UMTS networks. With increase in the demand for mobile data and voice access, these technologies are upgrading not only to meet the growing demand for access but also to enhance the user experience. One such advanced technology is Evolved Universal Terrestrial Radio Access (E-UTRA) which is a radio access network standard and is considered as a replacement of the UMTS and High-Speed Downlink Packet Access/High-Speed Uplink Packet Access (HSDPA/HSUPA) technologies covered under the 3GPP standards. The E-UTRA of the Long Term Evolution (LTE) is an entirely new air interface system, unlike the High-Speed Packet Access (HSPA), which is unrelated and incompatible with the wireless code division multiple access (W-CDMA). In addition, the E-UTRA not only provides higher data rate and lower latency but is also optimized for packet data. Thus, E-UTRA provides a single evolution path for providing enhancement in the data speeds, and spectral efficiency and allowing the provision of more functionality. LTE is a 4th generation cellular technology offering high-speed data and large capacity based on Orthogonal Frequency Division Multiple Access (OFDMA) technology. It was standardized by 3GPP in December 2008 and is specified in 3GPP Release 8 series, with continuous enhancements and further releases. The voice services over LTE is referred as Voice over LTE (VoLTE). The quality of voice through VoLTE is far superior compared to what is available today in legacy networks and is termed as High Definition (HD) voice.

The typical call flow of LTE and IMS PDN connection/disconnection with network is as follows:

Once the user equipment is powered ON, the UE will initiate the PDN connectivity procedure as per 3GPP TS 24.301 section 6.5.1. The purpose of UE request of PDN connectivity procedure is to setup a default EPS (Evolved Packet System) bearer for obtaining the services from network. The UE requests connectivity to a PDN by sending a PDN CONNECTIVITY REQUEST message to the network. If said request is accepted by the network, this procedure initiates the establishment of a default EPS bearer context. The procedure is used either to establish the first default bearer by including the PDN CONNECTIVITY REQUEST message into the initial attach message, or to establish subsequent default bearers to additional PDNs in order to allow the UE simultaneous access to multiple PDNs by sending the message stand-alone (PDN connectivity request with IMS APN for accessing VoLTE services simultaneously). If connectivity with the requested PDN is accepted by the network, a system shall initiate the default EPS bearer context activation procedure. Similarly when UE is powered OFF it will initiate detach request. The UE will initiate PDN disconnect procedure in some exceptional cases or optionally before initiating detach process as per 3GPP TS 24.301 6.5.2. The purpose of the UE requested PDN disconnection procedure is for the UE to request disconnection from one PDN. The UE can initiate this procedure to disconnect from any PDN as long as it is connected to at least one other PDN. With this procedure, all EPS bearer contexts established towards this PDN, including the default EPS bearer context, are released. In order to request PDN disconnection from a PDN, the UE shall send a PDN DISCONNECT REQUEST message to the system. The PDN DISCONNECT REQUEST message shall include the EPS bearer identity of the default bearer associated with the PDN to disconnect. Upon receipt of the PDN DISCONNECT REQUEST message, if it is accepted by the network, the system shall initiate the bearer context deactivation procedure by sending the DEACTIVATE EPS BEARER CONTEXT REQUEST message to disconnect default bearer associated with the PDN including the linked EPS bearer identity.

The detach procedure can be initiated either by the UE or from the network. In UE initiated detach procedure, the detach procedure is initiated by the UE by sending a DETACH REQUEST message. The Detach type IE included in the message indicates whether detach is due to a "switch off" or not. The Detach type IE also indicates whether the detach request is for EPS services only, for non-EPS services only, or for both. When the DETACH REQUEST message is received by the network, the network shall send a DETACH ACCEPT message to the UE and store the current EPS security context, if the Detach type IE does not indicate "switch off". Otherwise, if the UE is to be switched off, the UE shall try for a period of few seconds to send the DETACH REQUEST message. During this period, the UE may be switched off as soon as the DETACH REQUEST message has been sent. The detach procedure is completed when the network receives the DETACH REQUEST message. On reception of a DETACH REQUEST message indicating "switch off", the system shall delete the current EPS security context if it is a mapped EPS security context.

In the network-initiated detach procedure, the network initiates the detach procedure by sending a DETACH REQUEST message to the UE. The network may include an EPS Mobility Management (EMM) cause Information Element (IE) to specify the reason for the detach request. The Detach type IE in the message indicates "re-attach required" or "re-attach not required" or "IMSI detach". When receiving the DETACH REQUEST message and the detach type indicates "re-attach required", the UE shall deactivate the EPS bearer context(s) including the default EPS bearer context locally without peer-to-peer signalling between the UE and the system. The UE shall then send a DETACH ACCEPT message to the network and enter state EMM-DEREGISTERED. Furthermore, the UE shall initiate attach or combined attach procedure after the completion of the detach procedure. The UE may also re-establish any previously established PDN connection(s). Whenever the UE is powered-up, it initiates registration with the network on "Primary Internet" APN. After completion of initial attach with primary APN, the UE initiates PDN connectivity request with the network for "IMS" APN for voice service. Thus VoLTE devices have two APNs, Primary APN (operator specific) for data and "IMS" APN for voice with one default bearer for each APN. The device always maintains connections with both these APNs for both internet and voice services.

However, it is observed that the UE doesn't initiate IMS PDN connectivity request, though the UE successfully attaches with the network on Primary Internet APN. In such a scenario, the user will not be able to make or receive voice calls although the UE will be able to access High-Speed Internet (HSI) services. Also, the same UE will work on another operator, if another operator is on the 2G/3G CS Network. It is, therefore, difficult for the end-user to understand that the issue is of the device and not of the network for the interruption in voice call service. From a customer experience perspective, this behaviour is completely unacceptable since the user would not know if the IMS connection of the device has not been successfully attached and will miss incoming calls during this period of no connectivity. The user will realize something amiss only when he attempts an outgoing call which will fail and will not connect. This problem may be manually solved when UE would resume normal connectivity with IMS APN after the power-cycling of the UE or toggling the UE to airplane mode. This manual method is cumbersome and the user experience is not smooth.

Another challenge is the presence of multiple vendors for VoLTE UEs in open market which may exhibit this behaviour and since the operator do not exercise complete control over such devices, it will be very difficult to solve this problem from the UE perspective.

There are other several challenges in the existing arts for the VoLTE UE where the IMS PDN connectivity request is not initiated, thereby not able to connect to provide voice call hence not improving the overall connectivity and user experience of the wireless network. Therefore, there is a need for automatic novel method to provide solution for the IMS PDN connectivity request, to connect and provide continuous voice call connectivity for improving the overall connectivity and user experience.

SUMMARY

This section is provided to introduce certain objects and aspects of the present disclosure in a simplified form that are further described below in the detailed description. This summary is not intended to identify the key features or the scope of the claimed subject matter.

In order to overcome at least a few problems associated with the known solutions as provided in the previous section, an object of the present disclosure is to provide a novel automatic method and system for IMS PDN recovery in order to provide continuous voice call connectivity for improving the overall connectivity and user experience of the wireless network. Another object of the present disclosure is to provide an automatic solution for IMS PDN connectivity issue which was earlier solved by trial and error method by power-cycling of the user equipment or toggling the user equipment to airplane mode, to enable it to resume normal connectivity with IMS APN. Further yet another object of the present disclosure is to save the battery power by optimizing the connectivity, which will improve the IMS PDN request success rate in wireless networks. Further one more object of the present disclosure is to provide a method for the naïve emerging service operators to reduce complexities of network. The present disclosure also provides the users with the features and ability to receive seamless services simultaneously or sequentially consequently without any latency and call drops. Yet another object of the present disclosure is to reduce the probability of failure of service to users and improve the customer experience.

In order to achieve the aforementioned objectives, the present disclosure provides a method and system for IMS PDN recovery. One aspect of the present invention relates to a method of IMS PDN recovery. The said method comprises, receiving, from a user equipment at a system, one of an attach request with default Internet APN and a PDN disconnect request with IMS APN. Thereafter the method comprises initiating a timer by the system, for a finite period of time, wherein said timer is being initiated upon said receiving of one of a attach request with default Internet APN and a PDN disconnect request with IMS APN. The method then leads to detecting, upon expiry of said timer, by the system, the absence of a PDN connectivity request with IMS APN from a user equipment. Further the method comprises transmitting by the system, a detach request with re-attach required, to the user equipment in an event of absence of an IMS bearer between the user equipment and the system. Thereafter the method configured to receive at the system, a detach accept from user equipment, in response to said detach request and further said method recovers IMS PDN connection by receiving, at the system, an initial attach and a PDN connectivity request with IMS PDN from the user equipment.

Another aspect of the present disclosure encompasses a system for IMS PDN recovery, the system comprises, a receiver unit, configured to receive from a user equipment, one of a attach request with default Internet APN and a PDN disconnect request with IMS APN. The system further comprises a processor connected to said receiver unit and the processor is further configured to initiate a timer, for a finite period of time, wherein the said timer is being initiated upon said receiving of one of a attach request with default Internet APN and a PDN disconnect request with IMS APN and to detect, upon expiry of said timer, the absence of a PDN connectivity request with IMS APN from a user equipment. The system thereafter comprises a transmitter connected to said processor, the transmitter is further configured to transmit a detach request with re-attach required, to the user equipment in an event of absence of an IMS bearer between the user equipment and the system. Further said receiver unit is connected to the transmitter and the processor, and said receiver unit is further configured to receive, a detach accept from user equipment, in response to said detach request. The processor is further configured to recover IMS PDN connection by receiving form the user equipment, an initial attach and a PDN connectivity request with IMS PDN.

Yet another aspect of the present disclosure encompasses a method for IMS PDN recovery. The said method comprises, transmitting, by a user equipment, to a system, one of a attach request with default Internet APN and a PDN disconnect request with IMS APN, wherein in response to said one of the attach request with default Internet APN and the PDN disconnect request with IMS APN, the system initiates a timer for a finite period of time, and upon expiry of said timer, the system detects the absence of a PDN connectivity request with IMS APN from a user equipment. The method thereafter comprises, receiving, from the system at user equipment, a detach request with re-attach required, in an event of absence of an IMS bearer between the user equipment and the system. The method further comprises transmitting, by the user equipment, a detach accept to the system, in response to said detach request. The method thereafter recovers IMS PDN connection by initiating an initial attach and transmitting a PDN connectivity request with IMS PDN from the user equipment to the system.

Another aspect of the present disclosure encompasses a user equipment for IMS PDN recovery. The user equipment /VoLTE device further comprises a transmitter configured to transmit, to a system, one of a attach request with default Internet APN and a PDN disconnect request with IMS APN, wherein in response to said one of the attach request with default Internet APN and the PDN disconnect request with IMS APN, the system initiates a timer for a finite period of time, and upon expiry of said timer, the system detects the absence of a PDN connectivity request with IMS APN from a user equipment. Further, the user equipment/VoLTE device comprises a receiver configured to receive, from the system, a detach request with re-attach required, in an event of absence of an IMS bearer between the user equipment and the system. Further the transmitter of said user equipment/VoLTE device is further configured to transmit a detach accept to system, in response to said detach request, and to recover IMS PDN connection by initiating an initial attach and transmitting a PDN connectivity request with IMS PDN.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

The foregoing shall be more apparent from the following more detailed description of the disclosure.

DESCRIPTION OF THE INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The system may comprise a Mobility Management Entity (MME) that is key control-node of a cellular network/LTE network and operates as core connector for signalling to provide voice services (calls) and the data services to the user equipment.

As used herein, the user equipment is Voice over LTE (VoLTE) enabled computing device that is latched to MME of a cellular/LTE network, and thus, receives voice and data services from said cellular network. The user equipment may include but not limited to a mobile phone, a tablet, a phablet, a laptop, a desktop computer, a personal digital assistant (PDA), a consumer electronics device such as meter, television etc. and any such VoLTE device which is capable of receiving voice and data services from a cellular network and such other device obvious to a person skilled in the art.

As used herein, the "processing unit" or "processor" or "processing system" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, Application Specific Integrated Circuits, Field Programmable Gate Array circuits, any other type of integrated circuits, etc. The processor may perform signal coding data processing, input/output processing, and/ or any other functionality that enables the working of the system according to the present disclosure. More specifically, the processor or processing unit is a hardware processor.

As used herein, "memory unit" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media.

Systems depicted in some of the figures may be provided in various configurations. In some embodiments, the systems may be configured as a distributed system where one or more components of the system are distributed across one or more networks in a cloud computing system.

The present invention facilitates enabling/recovering IMS PDN connectivity between user equipment/VoLTE devices and Mobility Management Entity (MME), in an instance of receiving at the system, an indication of at least one of a, attach request for primary Internet APN and a PDN disconnect request for IMS APN form said user equipment.

In one of the instance, the present invention comprises, a mechanism to establish IMS PDN connectivity between a VoLTE device/user equipment and system, in a scenario where IMS PDN connectivity request is not initiated by said user equipment. In accordance with the present invention, the system is configured to initiate a timer for some finite amount of time, on receiving an Attach Request for default Internet APN from said VoLTE device. The system is also configured to check the VoLTE capability of the user equipment, further to check said VoLTE capability, the system checks the usage setting as "Voice centric", voice domain preference as "IMS PS voice-only" or "IMS PS voice preferred, and CS voice as secondary" to ascertain if the device is VoLTE capable. Thereafter upon expiration of said timer, if the system detects the absence of a PDN connectivity request with IMS APN from a user equipment, the system transmits a detach request with re-attach required, to the user equipment in an event of absence of an IMS bearer between said user equipment. The system upon transmitting said detach request in absence of said IMS bearer, is further configured to maintain a retry count value of said transmission of the detach request with re-attach required, also the system maintains a predefined retry count threshold and increments the retry count, until said retry count value is less than said predefined retry count threshold. Further the system is configured to, receive a detach accept from user equipment, in response to said detach request and thereafter also configured to recover IMS PDN connection by receiving an initial attach and a PDN connectivity request with IMS PDN from the user equipment.

In an another instance, in order to establish or recover the IMS PDN connectivity between a VoLTE device/user equipment and system, in a scenario where IMS PDN connectivity request is lost between said VoLTE device/user equipment and system or during the life cycle of the user equipment's connection with the system, a PDN Disconnect request with IMS APN is received at the system from said user equipment. The system in accordance with the present invention is configured to initiate a timer for some finite amount of time, in an event where an indication of, 'lost IMS PDN connectivity between said VoLTE device/user equipment and system', and/or 'a PDN Disconnect request with IMS APN', is received at the system from said user equipment. The system is also configured to check the VoLTE capability of the user equipment by checking the usage setting as "Voice centric", voice domain preference as "IMS PS voice-only" or "IMS PS voice preferred, and CS voice as secondary" to ascertain if the device is VoLTE capable. The system thereafter upon expiration of said timer, detects the absence of a PDN connectivity request with IMS APN from said user equipment. The system is further configured to transmit a detach request with re-attach required, to the user equipment in an event of absence of an IMS bearer between said user equipment. The system is configured to maintain a retry count value of said transmission of the detach request with re-attach required, also the system is configured to maintain a predefined retry count threshold and increments the retry count, until said retry count value is less than said predefined retry count threshold. Thereafter the system is configured to, receive detach accept from user equipment, in response to said detach request, and is further configured to recover IMS PDN connection by initiating an initial attach and transmitting a PDN connectivity request with IMS PDN from the user equipment to the system.

Thus the system as stated in the present invention, in any of these scenarios where IMS PDN not initiated by user equipment to system or IMS PDN connectivity is lost between said user equipment and system, efficiently establishes/recovers the IMS PDN connectivity.

Figure 1:
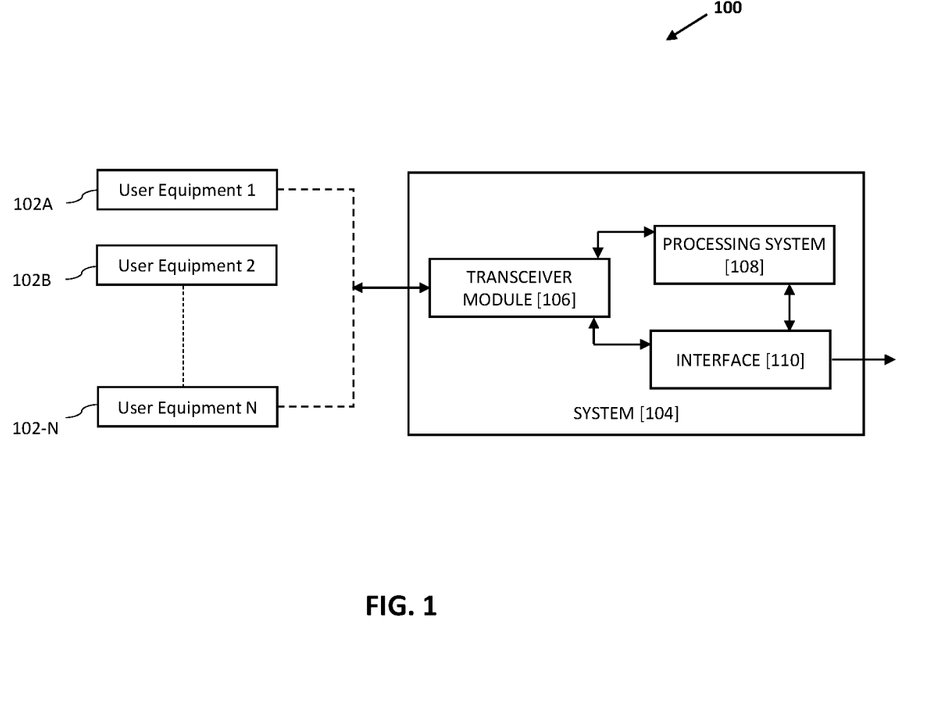
FIG. 1 illustrates an exemplary diagram of the overall network architecture, in which the present invention is implemented, in accordance with exemplary embodiment of the present disclosure.

Referring to FIG. 1, that illustrates a general overview of the network environment [100] in which the present invention is implemented, in accordance with exemplary embodiments of the present disclosure. As shown in FIG. 1, the user equipment [102A], [102B], [102C] . . . [102N] (Collectively referred to as user equipment [102]) may be connected to at least one System [104]. Further, the said system [104] comprises at least one transceiver [106], at least one processing system [108] and at least one interface [110]. The system [104] may provide network access to the one or more user equipment [102A-102N] connected to said system [104] and thereby, the one or more user equipment [102A-102N] may avail voice and data services using said system [104].

The said user equipment [102] may be Voice over LTE (VoLTE) enabled computing device that is latched to an system [104] of a cellular/LTE network, and thus, receives voice and data services from said cellular network. The user equipment [102] may include but not limited to a mobile phone, a tablet, a phablet, a laptop, a desktop computer, a personal digital assistant (PDA), a consumer electronics device such as meter, television etc. and any such VoLTE device which is capable of receiving voice and data services from a cellular network and such other device obvious to a person skilled in the art. In an instance the said user equipment [102] may be configured to avail voice and data services via system [104] by initiating at least one attach request for primary internet APN followed by an attach request for IMS PDN connectivity.

The processing system [108] may be configured to execute functions/operations performed by each module/component of the system [104]. The processing system [108] as used herein may include, but not limited to, a processor or set of processors such as a microprocessor, a multi-core microprocessor, a digital signal processor, a collection of electronic circuits, or a combination thereof and may be configured to perform operations/functions as described herein. The invention encompasses that said processing system [108] is configured to recover IMS PDN connectivity between at least one user equipment [102] and at least one system [104] as discussed in detail in the ensuing paragraphs.

Further, the transceiver [106] of system [104], coupled to said processing system [108] is configured to transmit or receive the communication signals/data/voice via system [104] to user equipment [102] or vice versa. The said transceiver [106] in an instance of no PDN connectivity request from user equipment [102] with IMS APN, is configured to transmit at least one detach request with re-attach required and to receive at least one detach accept in response to said transmitted detach request. Further, in one another instance, the transceiver [106] is also configured to transmit at least one of an attach accept in response to at least one of a attach request with default internet APN received on system [104] from user equipment [102].

The interface [110] of system [104], may be coupled to the transceiver [106] and processing system [108]. The said interface [110] may be configured for backhaul and to further reach out to an on-boarding server for information exchange.

Although a limited number of user equipment [102] are shown in FIG. 1, however, it will be appreciated by those skilled in the art that the invention encompasses the use of multiple such user equipment [102].

Figure 2:
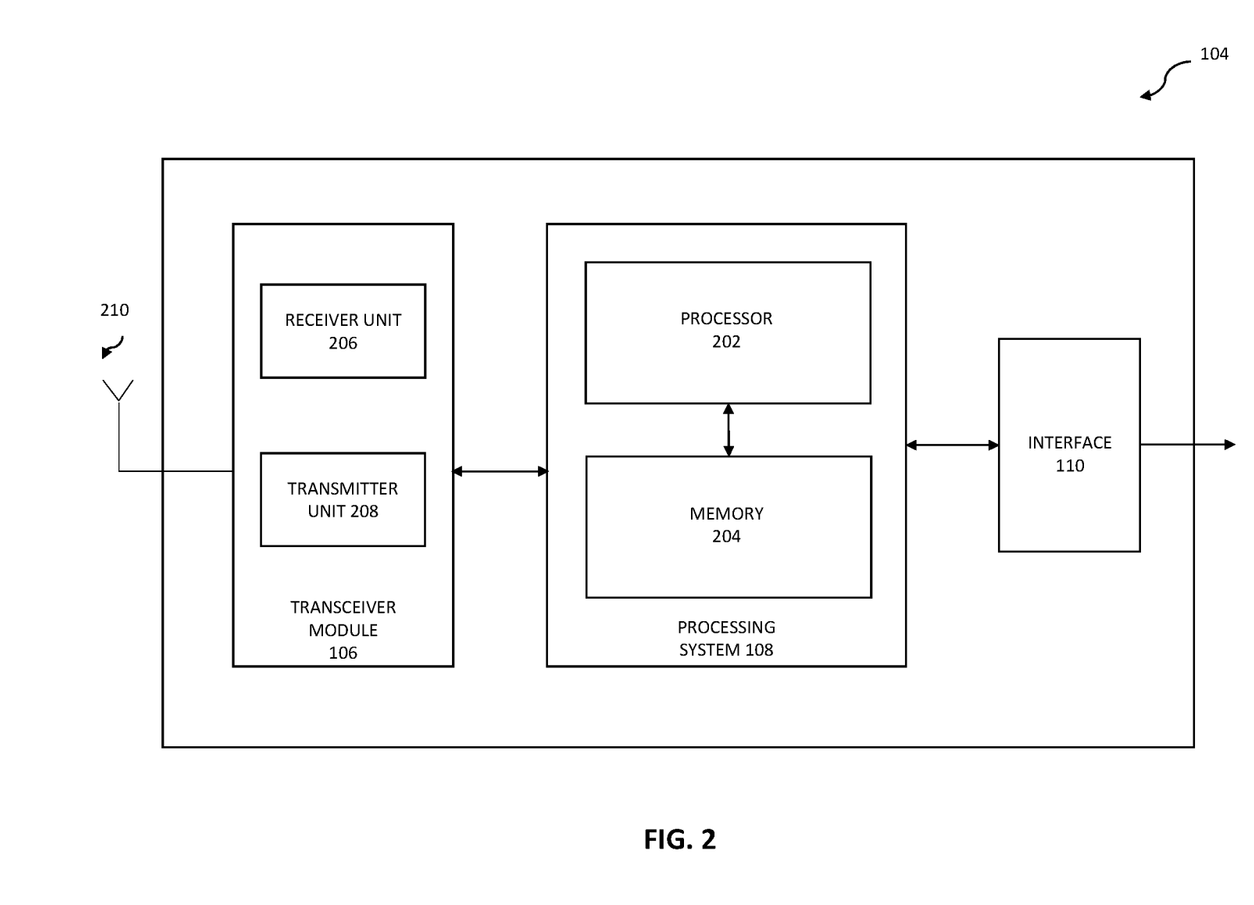
FIG. 2 illustrates an exemplary diagram of a system for IMS PDN recovery, in accordance with exemplary embodiment of the present disclosure.

Referring to FIG. 2, the present invention illustrates an exemplary diagram of the system [104], in accordance with exemplary embodiment of the present disclosure. As shown in FIG. 2, the system [104] comprises at least one antenna [210], at least one transceiver [106], at least one processing system [108] and at least one interface [110]. The said processing system [108] further comprises at least one processor [202] and at least one memory [204]. The transceiver [106] of said system [104] also further comprises at least one receiver unit [206] and at least one transmitter unit [208].

The antenna [210] coupled with the transceiver [106], is configured to transmit or receive the radio signals via said transceiver [106]. Further said transceiver [106] may include at least one transmitter unit [208] and at least one receiver unit [206], configured to transmit and receive the communication signals/data/voice between the system [104] and the user equipment [102], respectively. The receiver unit [206] of transceiver [106] is configured to receive an attach request with default internet APN and/or a PDN disconnect request with IMS APN from the user equipment [102]. The attach request with default internet APN is configured to enable primary APN connectivity. The PDN disconnect request with IMS APN is configured to disable the IMS PDN connectivity between at least one VoLTE enabled user equipment [102] and a system [104].

Further, the transmitter unit [208] of said transceiver [106], in response to the said received attach request with default Internet APN, is configured to transmit an attach accept response to the user equipment [102]. If the PDN connectivity request with IMS APN is not received at the receiver unit [206], then the transmitter unit [208] of said transceiver [106] is configured to transmit a detach request with re-attach required to the user equipment [102]. The receiver unit [206] of transceiver [106] in response to the said detach request is further configured to receive, a detach accept from user equipment [102].

Further in an another instance of transmission of attach accept from the transmitter unit [208] and further upon receiving a PDN connectivity request with IMS APN from the user equipment [102], said transmitter unit [208] may further be configured to transmit an activate default EPS bearer context request for IMS and further in response to said activate default EPS bearer context request, said receiver unit [206] of transceiver [106], receives an activate default EPS bearer context accept for IMS, from user equipment [102].

The processing system [108] coupled to said transceiver [106] and at least one interface [110], further comprises at least one processor [202] and at least one memory [204]. The said processing system [108] may be configured to execute functions/operations performed by each component of the system [104]. The processor [202] as used herein may include, but not limited to, a processor or set of processors such as a microprocessor, a multi-core microprocessor, a digital signal processor, a collection of electronic circuits, or a combination thereof and may be configured to perform operations/functions as described herein. The processor [202] is configured to initiate a timer, for a finite period of time, wherein the said timer is initiated upon receiving at the receiver unit [206], one of an attach request with default Internet APN and a PDN disconnect request with IMS APN from at least one user equipment [102]. The said processor [202] is further configured to detect the absence of PDN connectivity request with IMS APN from at least one user equipment [102], till the expiry of the said timer. Further, this absence of a PDN connectivity request with IMS APN from the user equipment [102] may be automatically predicted by the processor [202] using artificial intelligence. The said processor [202], in an instance may by using artificial intelligence automatically, configured to perform identification, request and response of the Detach Request in an event where IMS PDN not initiated by user equipment [102] or IMS PDN connectivity between at least one user equipment [102] and at least one system [104] is lost.

The processing system [108], may also be configured to automatically predict the disconnected users and proactively take decision for re-attach and may automatically calculate the rate of precision of such detach, and/or the change in a rate of re-attach.

In yet another instance, the processing system [108] using artificial intelligence may automatically retrieve the data associated with all the user equipment [102] that have transmitted an IMS PDN detach or where IMS PDN lost, on end-user population, specific end-user on network, and one or more target cell transmissions. The processing system [108] may be configured to automatically determine a trend in detach change, may automatically predict a time to trigger re-attach based on the trend and may automatically initiate the re-attach based on the time.

Further in an event of acknowledgement of said absence of PDN connectivity request with IMS APN, the processor [202] of processing system [108] is configured to recover IMS PDN connectivity between at least one system [104] and at least one user equipment [102] by receiving, an initial attach and of a PDN connectivity request with IMS PDN from the user equipment [102].

The processor [202] is also configured to determine if the user equipment [102] is VoLTE capable. To achieve this, the processor [202] determines a usage setting of the user equipment [102], wherein the usage setting is one of a voice-centric and a data-centric. The processor [202] is further configured to determine a voice domain preference of the user equipment [102], wherein the voice domain preference is one of an IMS PS voice only, an IMS PS voice preferred—CS voice as secondary, a CS only, a CS voice Preferred—IMS PS voice as secondary. The invention encompasses that the processor [202] via the transceiver [106] receives the usage setting and voice domain preference information from the user equipment [102]. In an event said usage setting is the voice centric and said voice domain preference is one of the IMS PS voice only and IMS PS voice preferred—CS voice as secondary, the processor [202] identifies said user equipment [102] as VoLTE capable.

Further, the memory [204] is configured to store information related to at least one default internet APN connectivity between at least one user equipment [102] and at least one system [104]. The said at least one default internet APN connectivity further comprises at least one primary APN connectivity.

Figure 3:
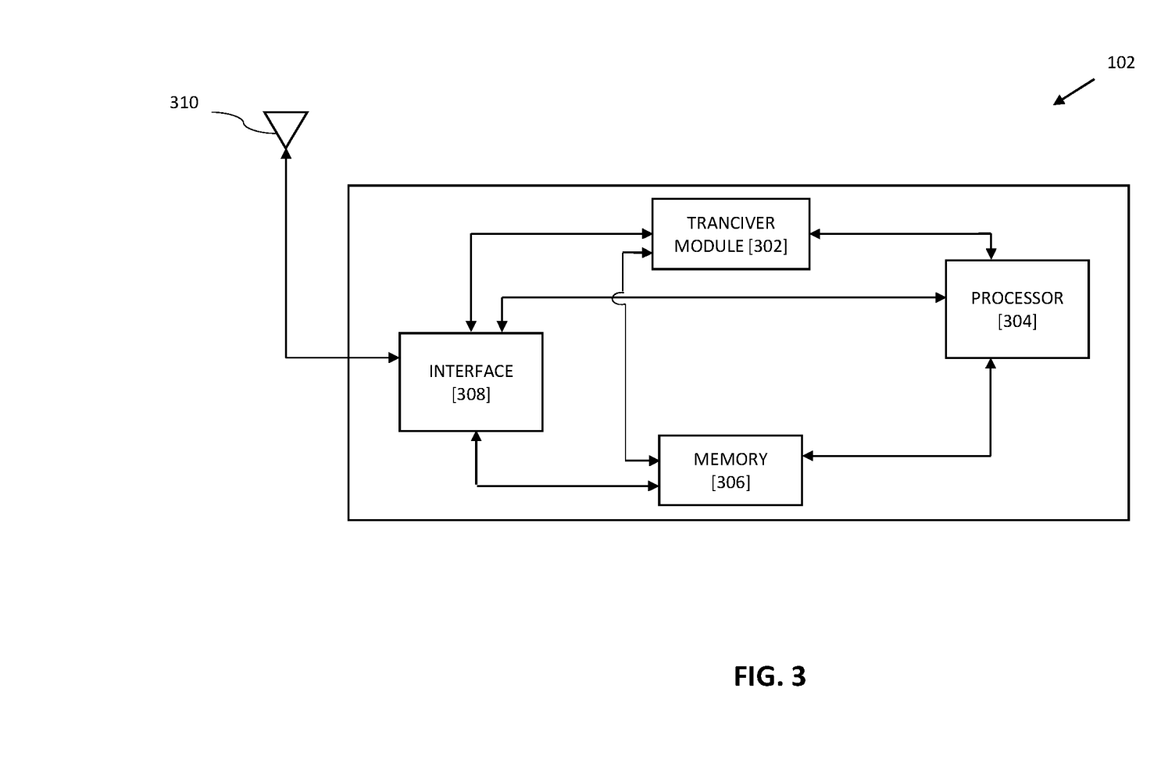
FIG. 3 illustrates a block diagram of user equipment, in accordance with exemplary embodiment of the present disclosure.

As illustrated in FIG. 3, the present invention illustrates a block diagram of user equipment (VoLTE device) [102], in accordance with exemplary embodiment of the present disclosure.

The user equipment [102] is a voice over LTE (VoLTE) enabled device and said user equipment [102] comprises at least one transceiver [302], at least one processor [304], at least one memory [306], at least one interface [308] and at least one antenna [310], said components being connected to each other.

The transceiver [302] of said user equipment [102] is coupled to said, at least one processor [304], at least one memory [306], at least one interface [308] and at least one antenna [310]. In an instance, the transceiver [302] may be configured to transmit an attach request with default Internet APN and/or a PDN disconnect request with IMS APN, to at least one system [104].

Further, in an event of transmission of at least one attach request with default Internet APN, the said transceiver [302] is configured to receive at least one attach accept from system [104]. Thereafter in an event when attach accept is received from system [104] on said transceiver [302], the said transceiver [302] is further configured to transmit at least one of an activate default EPS bearer context accept for IMS, in response to at least one of a activate default EPS bearer context request for IMS received on said user equipment [102] from said system [104].

Further, in an event when the IMS PDN connectivity between at least one user equipment [102] and at least one system [104] is lost, the said transceiver [302] is further configured to transmit to said system [104] at least one PDN disconnect request with IMS APN. Thereafter if a detach request with re-attach required response is received on the transceiver [302] of said user equipment [102], the said transceiver [302] is further configured to transmit a detach accept to the system [104].

Further, the said transceiver [302] is configured to operate in accordance with at least one timer initiated from said system [104]. The transceiver [302] recovers IMS PDN connection by initiating an initial attach and transmitting a PDN connectivity request with IMS PDN.

The processor [304] of the user equipment [102] is coupled to said, at least one transceiver [302], at least one memory [306], at least one interface [308] and at least one antenna [310]. In an instance the processor [304] may be configured to perform operations to recover IMS PDN connection between at least one user equipment [102] and at least one system [104] by initiating an attach request with default internet APN from said user equipment [102] to said system [104], wherein said attach request comprising at least one PDN connectivity request with IMS APN and at least one attach request with primary internet APN.

The memory [306] is coupled to said, at least one transceiver [302], at least one processor [304], at least one interface [308] and at least one antenna [310]. In an instance, the memory [306] is configured to store information related to at least one default internet APN connectivity between at least one user equipment [102] and at least one system [104]. The said at least one default internet APN connectivity further comprises at least one primary APN connectivity.

The interface [308] is coupled to said, at least one transceiver [302], at least one processor [304], at least one memory [306] and at least one antenna [310]. The interface [308] may be configured for backhaul and to further reach out to an on-boarding server for information exchange. Also, the antenna [310] coupled with the interface [308], is configured to transmit or receive the radio signals.

Figure 4:
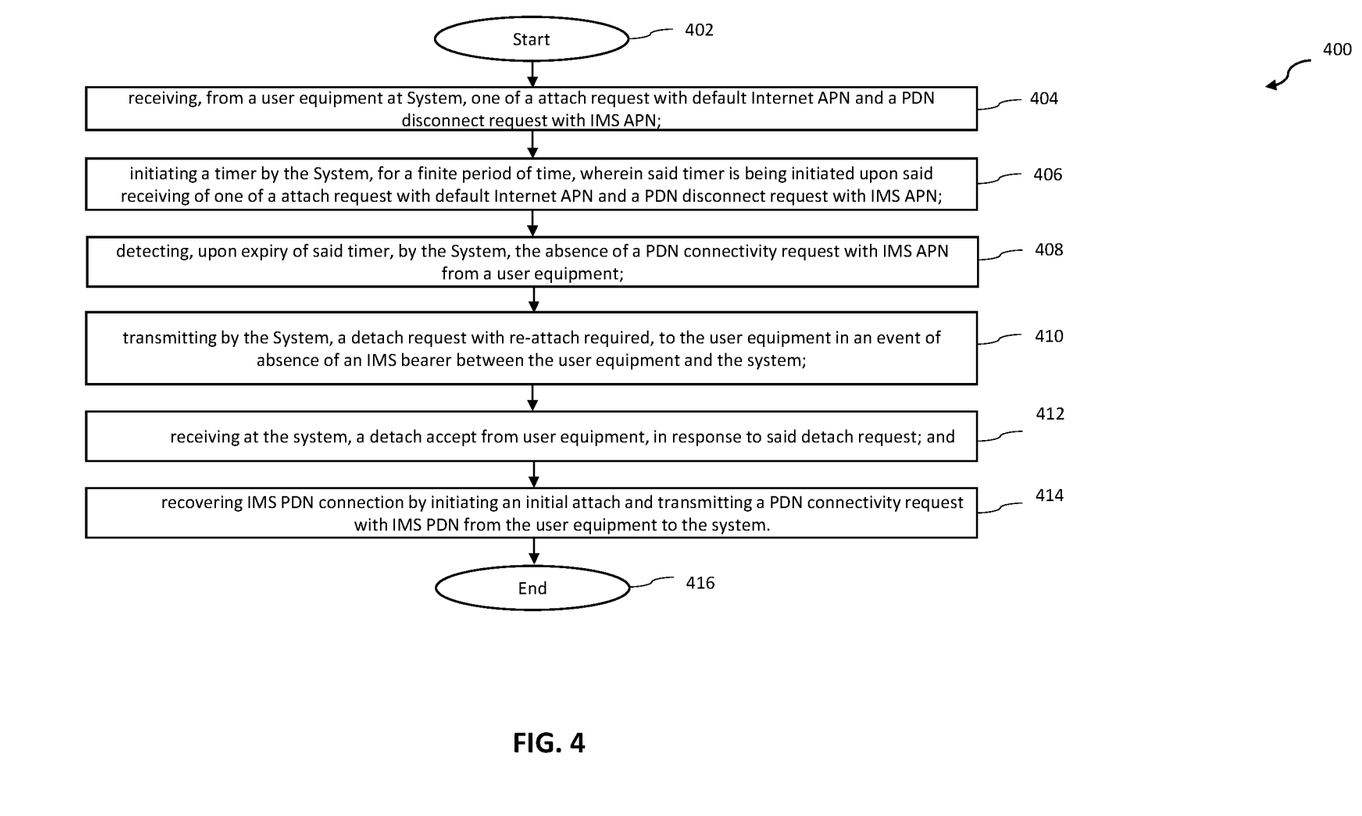
FIG. 4 illustrates an exemplary method flow diagram depicting method for IMS PDN recovery being performed by the system.

Referring to FIG. 4, an exemplary method flow diagram [400] depicting a method for IMS PDN recovery, being performed by the system [104], is shown.

The method begins at step [402]. For instance, the said method for IMS PDN recovery is implemented in a scenario where no PDN connectivity request from at least one user equipment [102] is received on at least one system [104]. Further, the said method may be initiated when the user equipment [102] fails to initiate a PDN connectivity request with IMS APN or when the IMS PDN connectivity between at least one user equipment [102] and at least one system [104] is lost. The said method is being implemented to recover/establish IMS PDN connectivity between said user equipment [102] and system [104].

As elaborated before, the processor [202] of the system [104] is configured to determine the VoLTE capability of a user equipment [102]. Further the said processor [202] is configured to determine at least one of a, usage setting of the user equipment [102], wherein usage setting is one of voice-centric and data-centric, a voice domain preference of the user equipment [102], wherein voice domain preference is one of an IMS PS voice only, IMS PS voice preferred—CS voice as secondary, CS only, CS voice Preferred—MS PS voice as secondary and thereafter processor [202] is further configured to identify the user equipment [102] as VoLTE capable in an event said usage setting is voice-centric and said voice domain preference is one of an IMS PS voice only and IMS PS voice preferred and CS voice as secondary.

Thereafter the method at step [404] is configured for receiving, from a user equipment [102] at a system [104], one of a attach request with default Internet APN and a PDN disconnect request with IMS APN. Thereafter, the method at step [406], initiates a timer by the processor [202] of the system [104], for a finite period of time, wherein said timer is being initiated upon said receiving of one of a attach request with default Internet APN and a PDN disconnect request with IMS APN. The timer is initiated to allow the system [104] to wait for an IMS PDN connectivity message from the user equipment [102], for said finite amount of time. The said timer may be one of a pre-defined timer and a user defined timer. In an instance, the finite amount of time of the timer maybe 60 seconds or more or less depending upon the said detection of IMS PDN connectivity between said user equipment [102] and said system [104]. This timer may be aborted via processor [202] of the system [104], in an event where the system [104] receives a user equipment [102] initiated detach request.

The method next proceeds to step [408] wherein the system [104] detects the absence of a PDN connectivity request with IMS APN from the user equipment [102], wherein the said detection is performed upon expiry of said timer. For instance, if the timer is for 60 seconds, then upon expiry of 60 seconds, the system [104] checks if a PDN connectivity request with IMS APN is received from the user equipment [102]. If no PDN connectivity request with IMS APN is received from the user equipment [102], the method proceeds to step 410.

Thereafter the said method at step [410] is configured to transmit via at least one system [104] a detach request with re-attach required, to the user equipment [102] in an event of absence of an IMS bearer between the user equipment [102] and the system [104]. Further in an instance if there is no IMS default bearer until the said expiry of the said timer, the system [104] may increase the retry count till a pre-defined count of for IMS PDN connectivity, wherein the said retry count is used to limit the detach trigger from the system [104] for certain period of times only to avoid infinite repetition. In case voice over WiFi services are also provided in the network then, and if IMS APN is offloaded successfully to the WiFi network, then only primary internet APN will be present at the system and so, in this case, system should not initiate the detach with re-attach required. To include this, the invention encompasses checking if voice-over Wi-Fi services are provided in the network and if IMS APN is offloaded to Wi-Fi network. In the affirmative, the invention encompasses not transmitting a detach request with re-attach required.

The method encompasses transmitting by the system [104], the detach request with re-attach required, to the user equipment [102] is further based on checking of IMS APN presence in Wi-Fi network.

In an instance, the processor [202] of the system [104] is configured to maintain a retry count value and a predefined retry count threshold and thereafter to increment the retry count upon transmitting the detach request with re-attach required, until retry count value is less than said predefined retry count threshold. The said retry count is further reset by the system [104], in an event when user turns ON/OFF Airplane mode or rebooted the user equipment [102]. For example, the retry count threshold may be set to 5.

The invention encompasses that the processor [202] may be configured to proactively transmit detach request with re-attach required in response to the prediction of absence of a PDN connectivity request with IMS APN from the user equipment [102] to the system [104].

Further, the method at step [412] is configured to receive at the system [104], a detach accept response from user equipment [102], in response to said detach request.

The method thereafter at step [414] is further configured to recover IMS PDN connection by receiving an initial attach and a PDN connectivity request with IMS PDN from the user equipment [102] to the system [104].

The method thereafter terminates at step [416], on successful recovery/establishment of IMS PDN connection between the user equipment [102] and the system [104].

Thus the method, in at least one of a scenario where, IMS PDN not initiated by the user equipment [102] to the system [104] and IMS PDN connectivity lost between said user equipment [102] and said system [104], efficiently establish/recovers the IMS PDN connectivity.

Figure 5:
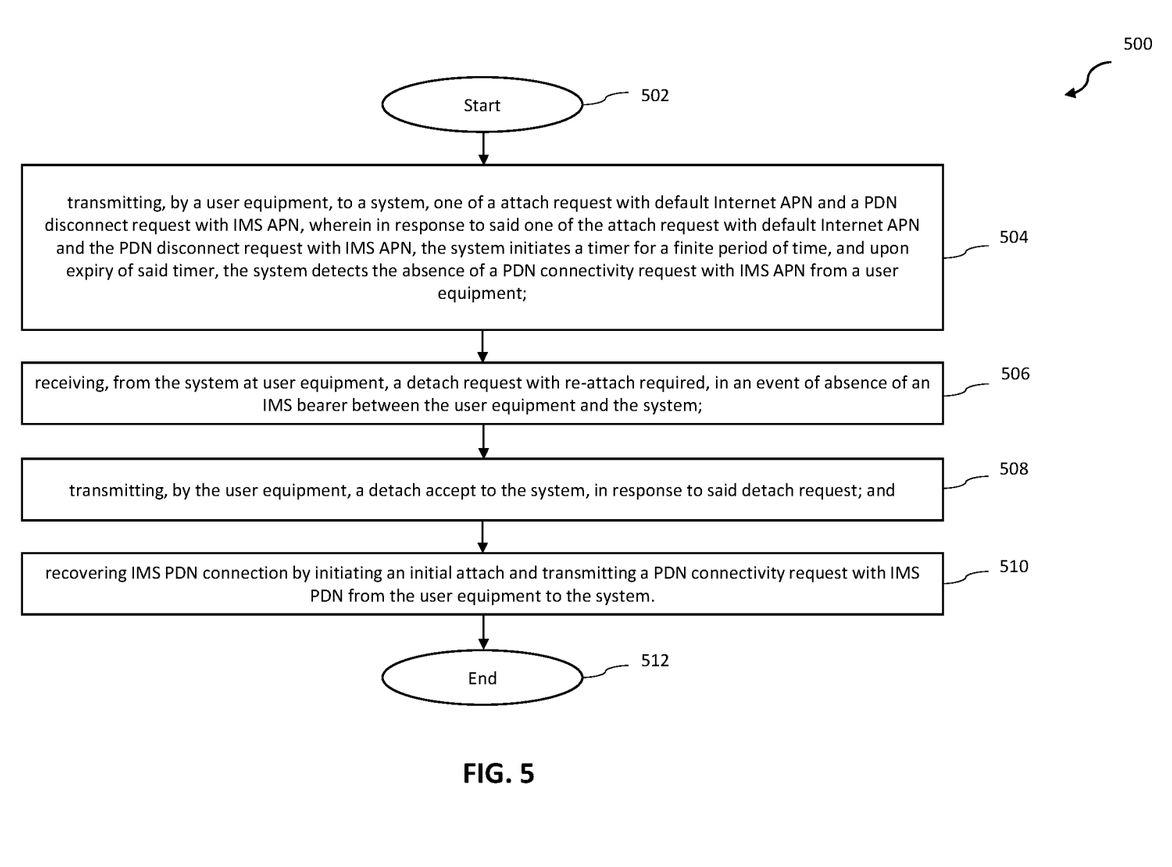
FIG. 5 illustrates an exemplary method flow diagram [500] depicting method for IMS PDN recovery being performed by the UE.

Referring to FIG. 5, an exemplary method flow diagram [500] depicting a method for IMS PDN recovery performed by the UE, is shown.

The method initiates at step [502]. For instance the said method for IMS PDN recovery begins in a scenario where no PDN connectivity request is sent from at least one user equipment [102] to the system [104]. Further, the said method may be initiated when the user equipment [102] fails to initiate a PDN connectivity request with IMS APN or when the IMS PDN connectivity between at least one user equipment [102] and at least one system [104] is lost. The said method is being implemented to recover/establish IMS PDN connectivity between said user equipment [102] and system [104].

At step [504] the user equipment [102] transmits to a system [104], one of a attach request with default Internet APN and a PDN disconnect request with IMS APN, wherein in response to said one of the attach request with default Internet APN and the PDN disconnect request with IMS APN, the system [104] initiates a timer for a finite period of time, and upon expiry of said timer, the system [104] detects the absence of a PDN connectivity request with IMS APN from a user equipment [102]. In an instance where user equipment [102] initiates an attach request with default Internet APN but fails to subsequently transmit PDN connectivity request with IMS APN, said method enables the system [104] to perform detection of the absence of PDN connectivity request with IMS APN and thereafter provides the automatic recovery of the IMS PDN connection.

Further in one another instance of IMS PDN connection lost between the user equipment [102] and the system [104] the method enables the system [104] to perform detection of the absence of IMS PDN connectivity by detecting that the UE has initiated a PDN disconnect request with IMS APN.

Thereafter, at step [506] the user equipment [102] receives from the system [104], a detach request with re-attach required, in an event of absence of an IMS bearer between the user equipment [102] and the system [104]. This detach request may be received in accordance with the timer and a retry count, wherein the retry count is maintained by the system [104] to avoid the infinite repetition of transmission of the detach request.

Subsequently, at step [508] the user equipment [102] transmits a detach accept to the system [104], in response to said detach request with re-attach required. Further in an instance subsequent to the transmission of the detach accept, the UE [102] transmits a attach request with default internet APN to the system [104], which further enable the system [104] to transmit an attach accept in response.

At step [510], the invention includes recovery of the IMS PDN connection by initiating an initial attach and transmitting a PDN connectivity request with IMS PDN from the user equipment [102] to the system [104]. In an instance when the said recovery of IMS PDN connection is being achieved, the user equipment [102] may transmit an activate default EPS bearer context accept for IMS, in response to an activate default EPS bearer context request for IMS received from the system [104].

The method thereafter terminates at step [512], on successful recovery/establishment of IMS PDN connection between the user equipment [102] and the system [104].

Figure 6:
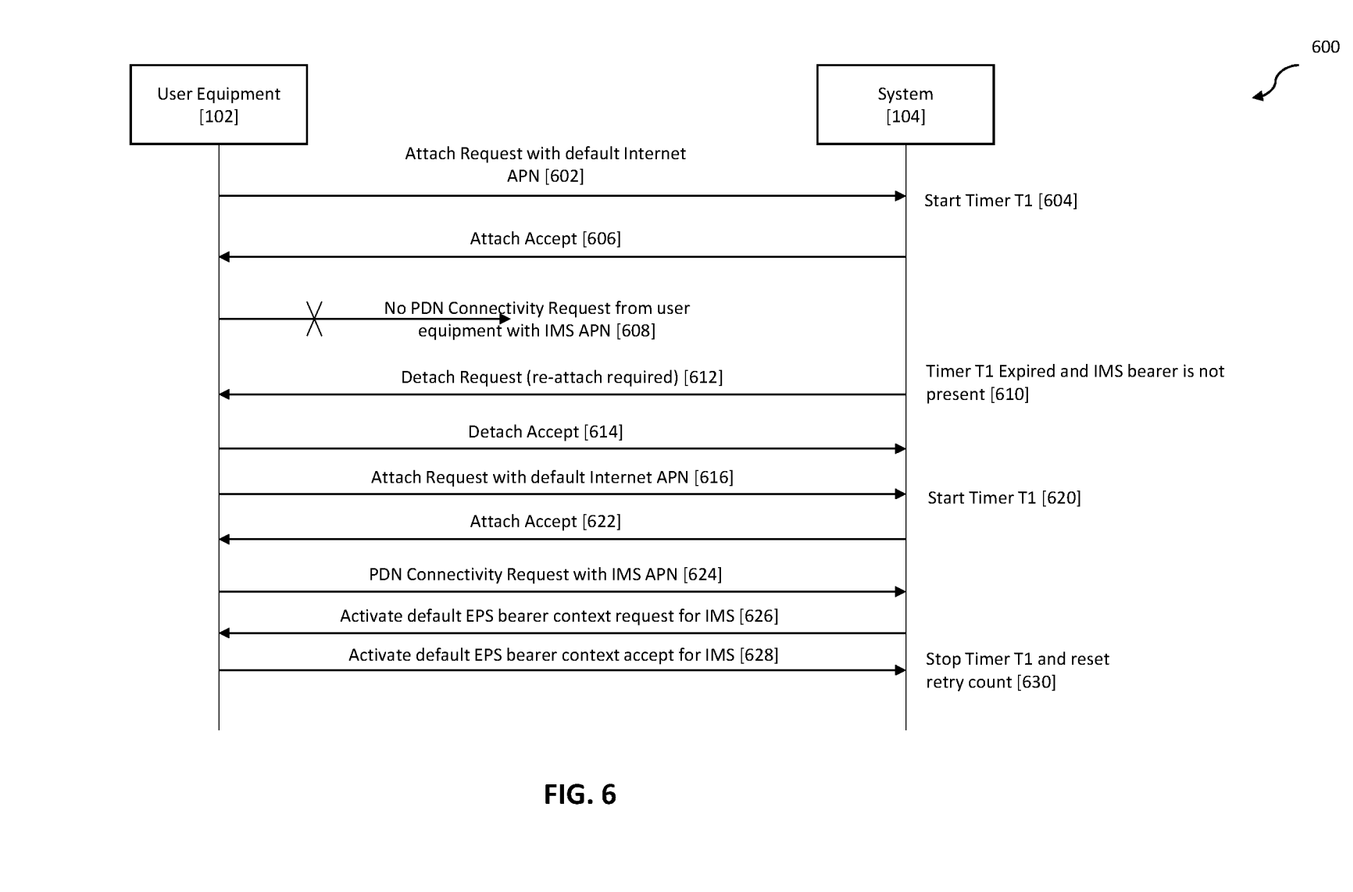
FIG. 6 illustrates an exemplary signalling flow diagram depicting method for IMS PDN recovery, in case of IMS PDN not initiated by user equipment.

Referring to FIG. 6, an exemplary flow diagram [600] depicting method for IMS PDN recovery, in case of IMS PDN not initiated by user equipment is shown.

The method starts at step [602], when an attach Request with default Internet APN is received at the system [104] from the user equipment [102]. The user equipment [102] is VoLTE enabled device and the system [104] is also configured to check the VoLTE capability of said user equipment [102]. The system [104] may check usage setting of user equipment [102] as "Voice centric", voice domain preference as "IMS PS voice-only" or "IMS PS voice preferred, and CS voice as secondary" to ascertain if the user equipment [102] is voice over LTE (VoLTE) capable.

The system [104] further at step [604] initiates a start timer T1 upon receiving the said attach Request with default Internet APN. The timer T1 is being initiated for a fixed interval of time and the said time interval may depend upon the connectivity parameters between the user equipment [102] and the system [104]. Further, the timer T1 allows the system to wait for the IMS PDN connectivity for the finite amount of time for which the timer runs. In an instance the said finite amount of time maybe 60 seconds or more or less depending upon the connectivity parameters including but not limited to signal strength, connection establishing time and pattern etc.

Further, the method at step [606] comprises transmission of an attach accept from the system [104] to the user equipment [102] in response to said received attach request with default Internet APN. Thereafter the system [104], waits for the IMS PDN connectivity request from the UE [102] for said fixed period of time (i.e. until the timer expires). At step [608], the absence of PDN Connectivity Request from user equipment [102] with IMS APN is detected. Thereafter, the method at step [610] upon expiry of Timer T1 identifies the absence of IMS bearer which further enables the system [104] to transmit detach request with re-attach required, and to maintain the retry count of transmission of such detach request. The maintenance of said retry count further comprises maintaining a threshold value of said retry count to limit detach trigger from the system [104] for certain times only. The retry count may also reset by the system [104], in at least one of the instance where user turns ON/OFF Airplane mode or rebooted the user equipment [102] or user equipment [102] successfully established IMS PDN connectivity with the system [104].

The method further at step [612] comprises, the transmission of detach request with re-attach required. Further, the said transmission of detach request is being maintained by the system [104] and the detach request is being sent by the system [104], up to configured retry count if there is no IMS attach for IMS PDN to avoid infinite repetition.

The method at step [614] comprises transmission of Detach Accept from user equipment [102] to system [104]. The said detach accept is being transmitted in response to the said of detach request with re-attach required.

Further to recover the IMS PDN connectivity between the user equipment [102] and the system [104], the user equipment [102], at step [616] initiates an attach request with default internet APN, which further enables the system [104] to initiate the timer T1 at step [620].

Thereafter in response to said attach request with default internet APN the system [104], at step [622] transmits an attach accept to user equipment [102]. Further at step [624], user equipment [102] transmits a PDN connectivity request with IMS APN to the system [104]. The system [104], thereafter at step [626] transmits an active default EPS bearer context request for IMS, to said user equipment [102], to enable the connectivity between the user equipment [102] and the system [104].

Further in response to said an activate default EPS bearer context request for IMS, from said system [104], the user equipment [102] at step [628] transmits an activate default EPS bearer context accept for IMS, to said system [104].

Thereafter at step [628], the method upon successful recovery/establishment of IMS PDN connectivity between the user equipment [102] and the system [104], configured to stop the timer T1 and reset the retry count.

Thus the method, in a scenario where IMS PDN is not initiated by the user equipment [102] to the system [104], efficiently establishes/recovers the IMS PDN connectivity.

Figure 7:
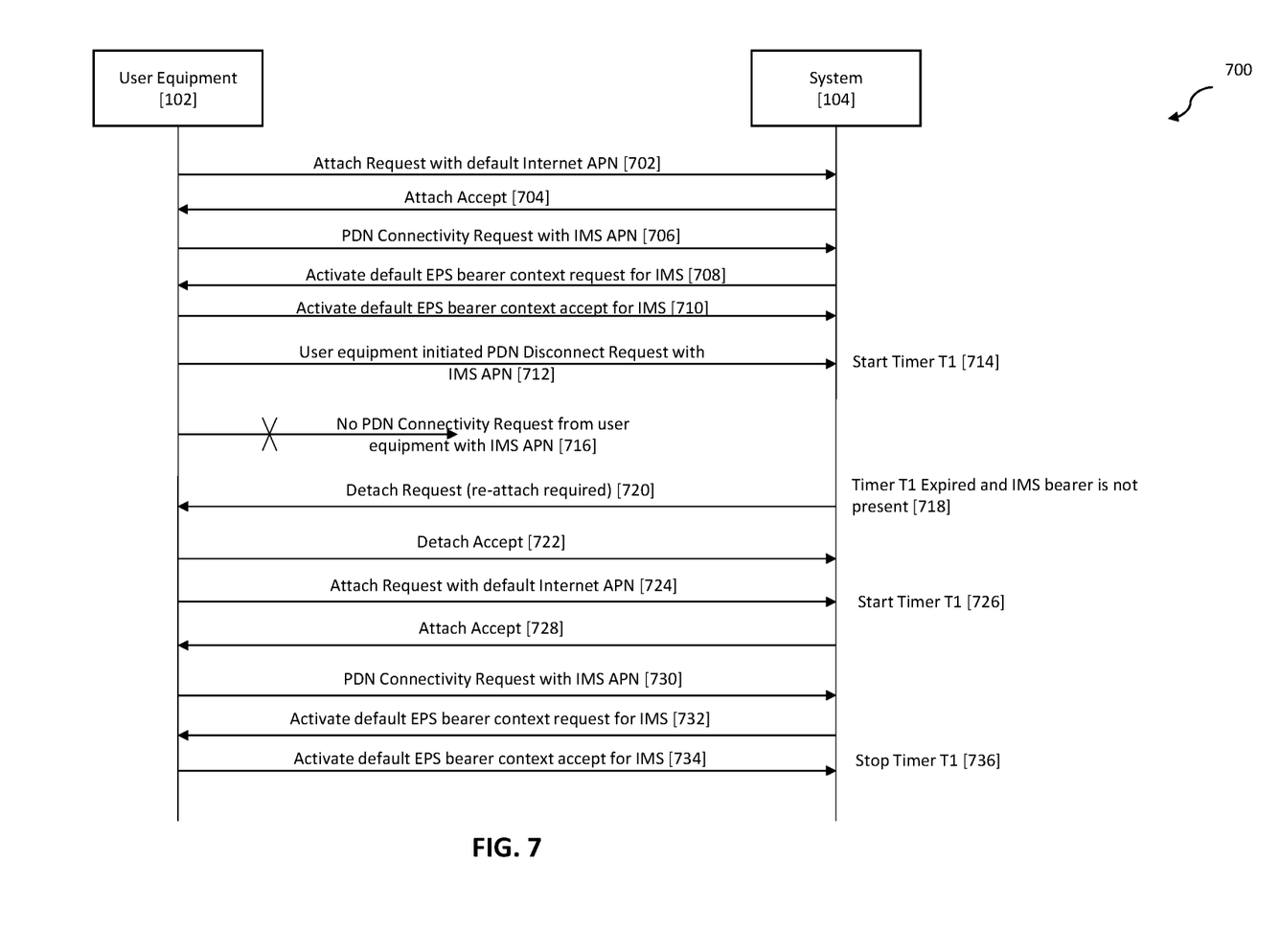
FIG. 7 illustrates an exemplary signalling flow diagram depicting method for IMS PDN recovery, in case of IMS PDN connectivity lost between the user equipment and system.

Referring to FIG. 7, an exemplary flow diagram [700] depicting method for IMS PDN recovery, in case of IMS PDN connectivity lost between the user equipment [102] and the system [104] is shown in accordance with the exemplary embodiments of the present invention.

The method at step [702] comprises receiving at the system [104], an attach Request with default Internet APN from the user equipment [102]. The user equipment [102] is VoLTE enabled device and in an instance the system [104] may be configured to check the VoLTE capability of said user equipment [102]. The system [104] may check usage setting of user equipment [102] as "Voice centric", voice domain preference as "IMS PS voice-only" or "IMS PS voice preferred, and CS voice as secondary" to ascertain if the user equipment [102] is voice over LTE (VoLTE) capable.

Further, the method at step [704] comprises transmission of an attach accept from the system [104] to the user equipment [102] in response to said received attach request with default Internet APN. At step [706], user equipment [102] transmits a PDN connectivity request with IMS APN to the system [104]. The system [104], thereafter at step [708] transmits an active default EPS bearer context request for IMS, to said user equipment [102], to enable the connectivity between the user equipment [102] and the system [104].

Further in response to said an activate default EPS bearer context request for IMS, from said system [104], the user equipment [102] at step [710] transmits an activate default EPS bearer context accept for IMS, to said system [104].

Thereafter, there may occur loss of IMS PDN connectivity between the user equipment [102] and the system [104], or the UE may intentionally disconnect the PDN connectivity, in which case the user equipment [102] further at step [712], is configured to transmit PDN disconnect request with IMS APN to the system [104]. In response to said receiving of transmit PDN disconnect request with IMS APN, the system [104] at step [714], initiates a timer T1. The timer T1 is being initiated for a fixed interval of time and the said time interval may depend upon the connectivity parameters between the user equipment [102] and the system [104]. Further, the timer T1 allows the system to wait for the IMS PDN connectivity for some finite amount of time. In an instance the said finite amount of time maybe 60 seconds or more or less depending upon the connectivity parameters including but not limited to signal strength, connection establishing time and pattern etc.

Thereafter the system [104], waits for the IMS PDN connectivity for said fixed interval of time and the method further at step [716] detects the absence of PDN Connectivity Request from user equipment [102] with IMS APN. Thereafter the method at step [718] upon expiry of Timer T1 identifies the absence of IMS bearer which further enables the system [104] to transmit detach request and to maintain the retry count of transmission of detach request with re-attach required. The maintenance of said retry count further comprises maintaining a threshold value of said retry count to limit detach trigger from the system [104] for certain times only. The retry count may also reset by the system [104], in at least one of the instance where the user turns ON/OFF Airplane mode or rebooted the user equipment [102] or user equipment [102] successfully established IMS PDN connectivity with the system [104].

The method further at step [720] comprises, the transmission of detach request with re-attach required. Further, the said transmission of detach request is being maintained by the system [104] and the detach request is being sent by the system [104], up to configured retry count if there is no IMS attach for IMS PDN to avoid infinite repetition.

The method at step [722] comprises transmission of Detach Accept from user equipment [102] to system [104]. The said detach accept is being transmitted in response to the said of detach request with re-attach required. Further in an instance, upon receiving said detach accept, the system [104] is further configured to abort the timer T1.

Further to recover the IMS PDN connectivity between the user equipment [102] and the system [104], the user equipment [102], at step [724] initiates an attach request with default internet APN, which further enables the system [104] to initiate the timer T1 at step [726].

Thereafter in response to said attach request with default internet APN the system [104], at step [728] transmits an attach accept to user equipment [102]. Further at step [730], user equipment [102] transmits a PDN connectivity request with IMS APN to the system [104]. The system [104], thereafter at step [732] transmits an active default EPS bearer context request for IMS, to said user equipment [102], to enable the connectivity between the user equipment [102] and the system [104].

Further in response to said an activate default EPS bearer context request for IMS, from said system [104], the user equipment [102] at step [734] transmits an activate default EPS bearer context accept for IMS, to said system [104].

Thereafter at step [736], the method upon successful recovery/establishment of IMS PDN connectivity between the user equipment [102] and the system [104], configured to stop the timer T1 and reset the retry count.

Thus the method, in a scenario where, IMS PDN connectivity is lost between the user equipment [102] and the system [104], efficiently establish/recovers the IMS PDN connectivity.

The interface, module, memory, database, processor and component depicted in the figures and described herein may be present in the form of a hardware, a software and a combination thereof. The connection shown between these components/module/interface in the network entity are exemplary and any components/module/interface in the network entity may interact with each other through various logical links and/or physical links. Further, the components/module/interface may be connected in other possible ways.

Though a limited number of servers, network entities, interface, module, memory, database, processor and component have been shown in the figures, however, it will be appreciated by those skilled in the art that the overall system of the present invention encompasses any number and varied types of the entities/elements.

While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

We claim:

1. A method for IP Multimedia Core Network Subsystem (IMS) Packet Data Network (PDN) recovery, the method comprising:
    receiving, at a system, from a user equipment, at least one of an attach request with default Internet Access Point Name (APN) or a PDN disconnect request with IMS APN;
    initiating, by the system, upon receiving the at least one of the attach request with default Internet APN or the PDN disconnect request with IMS APN, a timer for a finite period of time;
    detecting, by the system, upon expiration of the timer, absence of a PDN connectivity request with IMS APN from the user equipment;
    checking whether voice services are provided over a Wi-Fi network and the IMS APN is present in the Wi-Fi network;
    transmitting, by the system, a detach request with re-attach required, to the user equipment based on the checking in an event of absence of an IMS bearer between the user equipment and the system;
    receiving, by the system, a detach accept message from the user equipment, in response to the detach request; and
    recovering, by the system, the IMS PDN connection by receiving an initial attach request and a PDN connectivity request with IMS PDN from the user equipment.

2. The method as claimed in claim 1, wherein the at least one of an attach request with default Internet Access Point Name (APN) or a PDN disconnect request with IMS APN is received in response to that the user equipment fails to initiate the PDN connectivity request with the IMS APN or that the IMS PDN connection between the user equipment and the system is lost.

3. The method as claimed in claim 1, further comprising:
    transmitting, by the system, an attach accept message upon receipt of the at least one of an attach request with default Internet Access Point Name (APN) or a PDN disconnect request with IMS APN.

4. The method as claimed in claim 1, further comprising:
    determining, based on a usage setting and a voice domain preference of the user equipment, whether the user equipment is capable of Voice services over Long Term Evolution (VoLTE).

5. The method as claimed in claim 4, wherein determining whether the user equipment is VoLTE capable further comprises:
    determining the usage setting of the user equipment, the usage setting being a voice-centric or a data-centric;
    determining the voice domain preference of the user equipment, the voice domain preference being at least one of an IMS Packet Switched (PS) voice only, an IMS PS voice preferred-Circuit Switched (CS) voice as secondary, a CS only, or a CS voice Preferred-IMS PS voice as secondary; and identifying the user equipment as VoLTE capable in an event the usage setting is the voice-centric and the voice domain preference is at least one of the IMS PS voice only or IMS PS voice preferred-CS voice as secondary.

6. The method as claimed in claim 1, wherein transmitting the detach request with re-attach required to the user equipment comprises:
maintaining a retry count value and a predefined retry count threshold; and
incrementing the retry count value upon transmitting the detach request with re-attach required, until the retry count value is less than the predefined retry count threshold.

7. The method as claimed in claim 1, further comprising:
predicting the absence of a PDN connectivity request with IMS APN from the user equipment using artificial intelligence; and
transmitting the detach request with re-attach required in response to the prediction.

8. A system for IP Multimedia Core Network Subsystem (IMS) Packet Data Network (PDN) recovery, the system comprising:
a receiver configured to receive, from a user equipment, at least one of an attach request with default Internet Access Point Name (APN) or a PDN disconnect request with IMS APN;
a processor that is connected to the receiver and configured to:
initiate, upon receiving the at least one of the attach request with default Internet APN or the PDN disconnect request with IMS APN, a timer for a finite period of time;
detect, upon expiration of the timer, absence of a PDN connectivity request with IMS APN from the user equipment; and
check whether voice services are provided over a Wi-Fi network and the IMS APN is present in the Wi-Fi network;
a transmitter configured to transmit a detach request with re-attach required to the user equipment based on the checking in an event of absence of an IMS bearer between the user equipment and the system,
wherein the receiver is further configured to receive, a detach accept message from the user equipment, in response to the detach request, and
the processor is further configured to recover the IMS PDN connection by receiving an initial attach request and a PDN connectivity request with IMS PDN from the user equipment.

9. The system as claimed in claim 8, wherein the receiver of the system receives the at least one of an attach request with default Internet Access Point Name (APN) or a PDN disconnect request with IMS APN in response to that the user equipment fails to initiate the PDN connectivity request with the IMS APN or that the IMS PDN connection between the user equipment and the system is lost.

10. The system as claimed in claim 8, wherein the processor is further configured to determine whether the user equipment is capable of Voice services over Long Term Evolution (VoLTE) based on a usage setting and a voice domain preference of the user equipment.

11. The system as claimed in claim 8, wherein transmitting the detach request with re-attach required to the user equipment comprises:
maintaining a retry count value and a predefined retry count threshold; and
incrementing the retry count value upon transmitting the detach request with re-attach required, until the retry count value is less than the predefined retry count threshold.

12. The system as claimed in claim 8, wherein the processor is further configured to:
predict absence of a PDN connectivity request with IMS APN from the user equipment using artificial intelligence; and
transmit the detach request with re-attach required in response to the prediction.

13. A non-transitory computer-readable medium storing instructions for IP Multimedia Core Network Subsystem (IMS) Packet Data Network (PDN) recovery, the instructions executable by a processor to cause a system to perform operations comprising:
receiving, from a user equipment, at least one of an attach request with default Internet Access Point Name (APN) or a PDN disconnect request with IMS APN;
initiating, upon receiving the at least one of the attach request with default Internet APN or the PDN disconnect request with IMS APN, a timer for a finite period of time;
detecting, upon expiration of the timer, absence of a PDN connectivity request with IMS APN from the user equipment;
checking whether voice services are provided over a Wi-Fi network and the IMS APN is present in the Wi-Fi network;
transmitting a detach request with re-attach required to the user equipment based on the checking in an event of absence of an IMS bearer between the user equipment and the system;
receiving a detach accept message from the user equipment, in response to the detach request; and
recovering the IMS PDN connection by receiving an initial attach request and a PDN connectivity request with IMS PDN from the user equipment.

14. The non-transitory computer-readable medium as claimed in claim 13, wherein the operations further comprise: determining whether the user equipment is capable of Voice services over Long Term Evolution (VoLTE) based on a usage setting and a voice domain preference of the user equipment.

15. The non-transitory computer-readable medium as claimed in claim 14, wherein determining whether the user equipment is VoLTE capable further comprises:
determining the usage setting of the user equipment, the usage setting being a voice-centric or a data-centric;
determining the voice domain preference of the user equipment, the voice domain preference being at least one of an IMS Packet Switched (PS) voice only, an IMS PS voice preferred-Circuit Switched (CS) voice as secondary, a CS only, or a CS voice Preferred-IMS PS voice as secondary; and
identifying the user equipment as VoLTE capable in an event the usage setting is the voice-centric and the voice domain preference is at least one of the IMS PS voice only or IMS PS voice preferred-CS voice as secondary.

16. The non-transitory computer-readable medium as claimed in claim 13, wherein transmitting the detach request with re-attach required to the user equipment comprises:
maintaining a retry count value and a predefined retry count threshold; and incrementing the retry count value upon transmitting the detach request with re-attach required, until the retry count value is less than the predefined retry count threshold.

17. The non-transitory computer-readable medium as claimed in claim 13, wherein the operations further comprise:
   predicting the absence of a PDN connectivity request with IMS APN from the user equipment using artificial intelligence; and
   transmitting the detach request with re-attach required in response to said prediction.

* * * * *